United States Patent Office 3,197,317
Patented July 27, 1965

3,197,317
LOW DENSITY CEMENT FOR WELLS
Freeman D. Patchen, Dallas, Tex., assignor to Socony Mobil Oil Company, Inc., a corporation of New York
No Drawing. Filed Mar. 20, 1963, Ser. No. 266,503
7 Claims. (Cl. 106—97)

This invention relates to cements and relates more particularly to low density cements for use in wells.

Frequently in the drilling and treatment of wells extending from the surface of the earth to subterranean formations, it is necessary or desirable to employ a cementing composition. For example, in the drilling of a well for the recovery of oil or gas or water from a subterranean formation, the casing is secured in place in the well by cementing. In this operation, the cement is pumped downwardly from the surface of the earth through tubing to the bottom of the well and thence upwardly between the casing and the walls of the well. After the cement has been pumped between the casing and the walls of the well, pumping is discontinued and the cement is permitted to set in place. Also, for example, in the drilling of such wells, porous formations are often encountered from which an undesired fluid flows into the well or into which the drilling fluid used in the drilling of the well is lost. The method of treating such formations encountered during the drilling operations is to seal the formation with cement. In these, and other cementing procedures in a well, an aqueous slurry of Portland cement is used.

In cementing procedures in a well, it is essential that the time required by the cement to set be sufficiently long to permit placing of the cement slurry. While the use of a Portland cement slurry in wells having moderate temperatures ordinarily presents no particular difficulty from the standpoint of setting time, a problem arises in wells where high temperatures exist. At high temperatures, Portland cement slurry sets rapidly and setting can occur before the cement can be pumped from the surface of the earth into place in the well. To counteract the effects of high temperature on well cement slurries, additives to increase the setting time are employed in the cement slurry.

Further, in cementing procedures in a well, it is frequently desirable that the cement slurry have a low density. High density cement slurries require higher pumping pressures in order to place them at the desired position in the well. Additionally, high density cement slurries impose high static and dynamic pressures upon not only the formation to be treated but upon the other formations as well. Where these other formations are porous, the high pressures can result in loss of the cement slurry into the formations or loss of the water from the cement slurry into the formations with resultant setting of the cement prematurely and at an unintended position in the well. Additionally, high density cements are costly in that the ratio of cement to water is high and the high ratio is not necessary from the standpoint of obtaining competent cementing.

Reduction in the density of Portland cement slurry for use in wells is ordinarily effected by mixing bentonite with the slurry. Reduction in density by this means occurs as a result of the effect of the bentonite in permitting larger quantities of water to be employed in the cement slurry. Water has a lesser density than the dry cement and as a result the bulk volume of the slurry per unit amount of Portland cement slurry is increased. The addition of the bentonite to the cement slurry effects a reduction, at least at lower temperatures, in the compressive strength of the set cement. However, the reduction in the compressive strength of the set cement is not sufficiently great to prevent obtaining competent cementing. On the other hand, the addition of the bentonite to the cement slurry reduces the setting time of the cement to an undesired degree. This is especially so where additives are employed. Further, the amounts of bentonite required to effect a desired reduction in the density are undesirably high from the standpoint of economy.

It is an object of this invention to provide a low density Portland cement slurry for use in wells.

It is another object of this invention to reduce the amount of material required for addition to a Portland cement slurry to attain a desired low density of the slurry.

It is another object of this invention to increase the pumping time of low density Portland cement slurries.

It is another object of this invention to provide an additive for reducing the density of Portland cement slurry which does not reduce the effect of additives for increasing the pumping time of the cement slurry.

In accordance with the invention, a slurry of Portland cement and water is provided which contains attapulgite as the essential ingredient for reducing the density of the slurry.

I have found that the addition of attapulgite to Portland cement slurry effectively reduces the density of the slurry. Additionally, I have found that the amount of attapulgite required to reduce the density of the Portland cement slurry to a desired value is less than the amount of bentonite required to effect the same result. Furthermore, I have found that the attapulgite, while effectively reducing the density of the Portland cement slurry, effects a much lesser decrease in the setting time of the cement slurry. Moreover, the compressive strength of the set cement containing attapulgite is sufficiently high to effect competent cementing.

The attapulgite for use in the Portland cement slurry of the invention consists principally of the mineral attapulgite. This mineral is mined in the United States in southwestern Georgia and northwestern Florida. It is a hydrous magnesium aluminum silicate and occurs in horizontal sedimentary strata overlaid by various depths of overburden. Further, it is a unique clay mineral in that its crystalline structure is needlelike in shape. Additional reference, for the type of attapulgite which may be employed in the Portland cement slurry, is made to "Composition and Properties of Oil Well Drilling Fluids," by Walter F. Rogers, revised edition, 1953, Gulf Publishing Company, Houston, Texas, pp. 222 to 224.

The amount of Portland cement employed in the slurry may be that presently employed commercially in well cements. Particularly, the amounts employed are those employed commercially in Portland cement slurry containing bentonite. The Portland cement ordinarily will comprise between about 30 percent and about 70 percent by weight of the slurry. However, greater and lesser amounts of Portland cement may also be employed in the slurry as desired.

The amount of water employed in the slurry may also be that presently employed commercially in well cements. Particularly, the amounts employed are those employed commercially in Portland cement slurry containing bentonite. Thus, the amount of water ordinarily may constitute between about 30 percent and about 60 percent by weight of the slurry.

The amount of attapulgite employed in the slurry will depend upon the extent to which the density of the cement slurry is to be reduced. Ordinarily, effective reduction in the density of the cement slurry is obtained with an amount of attapulgite of the order of 0.5 percent by weight of the Portland cement in the slurry. However, greater amounts may be employed. For example, satisfactory results of reduction in density are obtained with an amount of attapulgite of about 4 percent by weight of the cement in the slurry. Amounts of attapulgite greater than 4 percent by weight of the cement in the slurry may also be employed. However, ordinarily, unit increases in the amount of attapulgite in excess of about 5 percent by weight of the cement in the cement slurry do not effect proportionate decreases in the density of the cement slurry as do unit increases in the amounts of attapulgite less than about 5 percent by weight. Thus, ordinarily, amounts of attapulgite in excess of about 5 percent by weight of the cement in the slurry are not employed unless maximum decrease in the density of the cement slurry is desired. In any case, the amount of attapulgite should not exceed about 10 percent by weight of the cement in the slurry.

The Portland cement slurry containing the attapulgite may also contain other materials. For example, the cement slurry may contain, in addition to the attapulgite, various additives for retarding the setting time. Thus, the cement slurry may contain salts of lignosulfonic acid and various of the cellulose derivatives such as carboxymethyl cellulose and its salts and carboxymethylhydroxyethyl cellulose. Additionally, the cement slurry may contain calcium chloride or sodium chloride. In connection with the latter material, the water employed for preparing the cement slurry may be sea water and in this way the slurry will contain sodium chloride. Further, the cement slurry may contain various additives for reducing filter loss. The cement slurry may also contain such materials as finely ground silica. Moreover, the aqueous phase of the cement slurry may contain oil emulsified with the water and may contain an emulsifying agent to effect emulsification.

The following examples will be further illustrative of the invention.

EXAMPLE 1

In this example, three cement slurries were prepared. These slurries were prepared employing a commercial cement of the Class E type, American Petroleum Institute. The cement employed contained an additive for increasing the setting time. The first slurry contained 70 parts by weight of water and 100 parts by weight of cement. The second slurry contained 70 parts by weight of water, 100 parts by weight of cement and bentonite in the amount of 6 percent by weight of the cement. The third slurry contained 70 parts by weight of water, 100 parts by weight of cement and attapulgite in the amount of 2 percent by weight of the cement.

Following preparation, the densities and the setting times of the slurries were measured. The densities of the slurries were measured in accordance with Section IV of the "API Recommended Practice for Testing Oil-Well Cements and Cement Additives" of the American Petroleum Institute, API RP 10B, 10th edition, March 1961. The setting times of the slurries were measured in terms of the thickening times of the slurries as set forth in this same publication. The thickening times of the cement slurries, as set forth in this publication, are measured in a high pressure, high temperature consistometer. The thickening times are the times the cement slurries remain pumpable. In the consistometer, conditions simulating the pumping of a cement slurry into a well in the earth are reproduced and conditions of temperature and pressure are varied to simulate pumping of cement to an indicated depth. In accordance with the publication, a cement is regarded as being pumpable until its viscosity, under the pressures and temperatures employed for the particular pumping schedule, i.e., the particular depth of pumping to be simulated, which schedules are set out in the publication, exceeds 100 poises. In the present instance, the measurements were made in accordance with Schedule 8, 14,000-foot casing—Cementing Well Simulation Test. In this schedule, the minimum acceptable thickening time is 84 minutes.

The results are given in the table below.

Table I

| Composition | Density, Lbs./Gal. | Thickening Time, Minutes | Percent Change in Thickening Time |
| --- | --- | --- | --- |
| Cement+Water | 15.7 | 190 | |
| Cement+Water+Bentonite | 13.9 | 70 | −63 |
| Cement+Water+Attapulgite | 13.9 | 124 | −35 |

It will be observed from the table that the same density of cement slurry was obtained employing 2 percent attapulgite and 6 percent bentonite. More specifically, it required 6 percent by weight of benonite to reduce the density of the cement slurry from 15.7 pounds per gallon to 13.9 pounds per gallon. On the other hand, it required only 2 percent by weight of attapulgite to reduce the density to the same extent. Thus, lesser amounts of attapulgite are required to effect a desired reduction in density. Further, it will be observed from the table that the bentonite reduced the thickening time of the cement slurry to 70 minutes. This is a 63 percent decrease in thickening time and is below the minimum acceptable thickening time for the schedule of 84 minutes. However, it will also be observed from the table that the attapulgite reduced the thickening time to 124 minutes. This is only a 35 percent decrease in the thickening time.

EXAMPLE 2

In this example, three slurries containing water, Portland cement, and attapulgite were prepared. The Portland cement was Class A, American Petroleum Institute. The first slurry (A) contained 50 parts by weight of cement, 40 parts by weight of water, and 0.5 part by weight of attapulgite. The second slurry (B) contained 50 parts by wieght of cement, 50 parts by weight of water, and 1 part by weight of attapulgite. The third slurry (C) contained 50 parts by weight of cement, 55 parts by weight of water, and 1.5 parts by weight of attapulgite. The densities of each of these slurries were measured. Each of the slurries was divided into nine parts and three parts of each of the slurries were cured at 100° F., 140° F., and 180° F., respectively. At the end of 1 day, 7 days, and 30 days, one of the three parts cured at each of the three temperatures was tested for compressive strength. The table below gives the results obtained.

Table II

| Slurry | Density, Lbs./Gal. | Temperature of Curing, °F. | Curing Time, Days | Compressive Strength, Lbs./Sq. Inch |
| --- | --- | --- | --- | --- |
| A | 13.3 | 100 | 1 | 425 |
|   |      |     | 7 | 1,600 |
|   |      |     | 30 | 2,185 |
|   |      | 140 | 1 | 800 |
|   |      |     | 7 | 1,650 |
|   |      |     | 30 | 1,900 |
|   |      | 180 | 1 | 1,150 |
|   |      |     | 7 | 1,775 |
|   |      |     | 30 | 1,750 |
| B | 12.6 | 100 | 1 | 175 |
|   |      |     | 7 | 800 |
|   |      |     | 30 | 1,350 |
|   |      | 140 | 1 | 350 |
|   |      |     | 7 | 975 |
|   |      |     | 30 | 1,000 |
|   |      | 180 | 1 | 550 |
|   |      |     | 7 | 800 |
|   |      |     | 30 | 825 |
| C | 12.3 | 100 | 1 | 125 |
|   |      |     | 7 | 650 |
|   |      |     | 30 | 1,090 |
|   |      | 140 | 1 | 275 |
|   |      |     | 7 | 675 |
|   |      |     | 30 | 700 |
|   |      | 180 | 1 | 425 |
|   |      |     | 7 | 700 |
|   |      |     | 30 | 700 |

EXAMPLE 3

In this example, three cement slurries were prepared. The first slurry (D) contained 46 parts by weight of water, 100 parts by weight of Portland cement, and 0.15 part by weight of carboxymethylhydroxyethyl cellulose to effect increase in the thickening time of the cement. The second slurry (E) contained 78 parts by weight of water, 100 parts by weight of Portland cement, 0.15 part by weight of carboxymethylhydroxyethyl cellulose, and 6 parts by weight of bentonite. The third slurry (F) contained 71 parts by weight of water, 100 parts by weight of Portland cement, 0.15 parts by weight of carboxymethylhydroxyethyl cellulose, and 1 part by weight of attapulgite. The cement in each slurry was Class A, American Petroleum Institute. Following preparation, the densities and the setting times of the slurries were measured employing the same procedures as in Example 1. The table gives the results.

Table III

| Slurry | Density, Lbs./Gal. | Thickening Time, Minutes | Percent Change in Thickening Time |
|---|---|---|---|
| D | 15.7 | 113 | |
| E | 13.9 | 67 | −40 |
| F | 13.9 | 121 | +7 |

It will be observed from the table that the same density of cement slurry was obtained employing 1 percent attapulgite and 6 percent bentonite. Further, it will be observed from the table that the bentonite reduced the thickening time of the cement to 67 minutes, which is less than the minimum acceptable thickening time of 84 minutes for the schedule. This is a reduction of 40 percent in thickening time. On the other hand, it will be observed from the table that the attapulgite increased the thickening time to 121 minutes, an increase in thickening time of 7 percent.

Having thus described my invention, it will be understood that such description has been given by way of illustration and example and not by way of limitation, reference for the latter purpose being had to the appended claims.

I claim:

1. A cement slurry for use in wells comprising Portland cement, water, and attapulgite, the Portland cement being in an amount of at least about 30 percent by weight of said slurry, the water being in an amount of at least about 30 percent by weight of said slurry, and the attapulgite being in an amount between about 0.5 percent and 10 percent by weight of said Portland cement.

2. A cement slurry for use in wells comprising Portland cement, water, and attapulgite, the Portland cement being in an amount of between about 30 and 70 percent by weight of said slurry, the water being in an amount of between about 30 and 60 percent by weight of said slurry, and the attapulgite being in an amount between about 0.5 and 5 percent by weight of said Portland cement.

3. A cement slurry for use in wells comprising Portland cement, water, and attapulgite, the Portland cement being in an amount between about 30 and 70 percent by weight of said slurry, the water being in an amount between about 30 and 60 percent by weight of said slurry, and the attapulgite being in an amount between about 0.5 and 10 percent by weight of said Portland cement.

4. In the process for the treatment of a well in the earth wherein a cement slurry is pumped into said well and permitted to set therein, the steps which include forming a cement slurry comprising Portland cement, water, and attapulgite, the Portland cement being in an amount of at least about 30 percent by weight of said slurry, the water being in an amount of at least about 30 percent by weight of said slurry, and the attapulgite being in an amount of at least about 0.5 percent by weight of said Portland cement, and pumping said slurry into said well.

5. In the process for the treatment of a well in the earth wherein a cement slurry is pumped into said well and permitted to set therein, the steps which include forming a cement slurry comprising Portland cement, water, and attapulgite, the Portland cement being in an amount of at least about 30 percent by weight of said slurry, the water being in an amount of at least about 30 percent by weight of said slurry, and the attapulgite being in an amount between about 0.5 percent and 10 percent by weight of said Portland cement, and pumping said slurry into said well.

6. In the process for the treatment of a well in the earth wherein a cement slurry is pumped into said well and permitted to set therein, the steps which include forming a cement slurry comprising Portland cement, water, and attapulgite, the Portland cement being in an amount of between about 30 and 70 percent by weight of said slurry, the water being in an amount of between about 30 and 60 percent by weight of said slurry, and the attapulgite being in an amount between about 0.5 and 5 percent by weight of said Portland cement, and pumping said slurry into said well.

7. In the process for the treatment of a well in the earth wherein a cement slurry is pumped into said well and permitted to set therein, the steps which include forming a cement slurry comprising Portland cement, water, and attapulgite, the Portland cement being in an amount between about 30 and 70 percent by weight of said slurry, the water being in an amount between about 30 and 60 percent by weight of said slurry, and the attapulgite being in an amount between about 0.5 and 10 percent by weight of said Portland cement, and pumping said slurry into said well.

References Cited by the Examiner

UNITED STATES PATENTS

| | | | |
|---|---|---|---|
| 2,364,621 | 12/44 | Cross et al. | 117—65 |
| 2,665,259 | 1/54 | Buffett | 106—73 |
| 2,945,769 | 7/60 | Gama et al. | 106—98 |
| 2,961,044 | 11/60 | Shell | 106—98 |
| 3,071,481 | 1/63 | Beach et al. | 106—97 |

FOREIGN PATENTS 472,181   3/51   Canada.

TOBIAS E. LEVOW, *Primary Examiner.*